United States Patent
Cozar et al.

(10) Patent No.: US 6,447,716 B1
(45) Date of Patent: Sep. 10, 2002

(54) WELDING ELECTRODE MADE OF A NICKEL-BASED ALLOY AND THE CORRESPONDING ALLOY

(75) Inventors: Ricardo Cozar, La Fermete (FR); Albert Bruyere, St Denis lès Bourg (FR); Bernard Bonnefois, Le Breuil (FR)

(73) Assignees: Ugine-Savoie Imphy, Ugine (FR); Sprint Metal-Societe de Production Internationale de Trefiles, Puteaux (FR)

( * ) Notice: Subject to any disclaimer, the term of this patent is extended or adjusted under 35 U.S.C. 154(b) by 0 days.

(21) Appl. No.: 09/451,917

(22) Filed: Dec. 1, 1999

(30) Foreign Application Priority Data

Dec. 1, 1998 (FR) .............................. 98 15104

(51) Int. Cl.$^7$ .......................... C22C 19/05; B23K 35/30
(52) U.S. Cl. .......................... 420/445; 75/302; 148/428; 420/453
(58) Field of Search ................. 420/445, 446, 420/447, 448, 449, 450; 148/428; 75/302

(56) References Cited

U.S. PATENT DOCUMENTS

| | | | |
|---|---|---|---|
| 3,113,021 A | * 12/1963 | Witherell | ...................... 75/171 |
| 3,181,970 A | * 5/1965 | Peck et al. | ................... 117/205 |
| 3,650,734 A | 3/1972 | Kantor et al. | |
| 4,415,530 A | * 11/1983 | Hunt | ........................... 420/453 |
| 4,639,576 A | * 1/1987 | Shoemaker et al. | ... 219/146.23 |
| 5,529,642 A | * 6/1996 | Sugahara et al. | ........... 148/427 |

FOREIGN PATENT DOCUMENTS

| | | |
|---|---|---|
| DE | 195 36 978 | 4/1996 |
| EP | 0 247 577 | 12/1987 |

OTHER PUBLICATIONS

Patent Abstracts of Japan vol. 013, no. 365 (M–859), Aug. 15, 1989, (w/copy of Japanese language Reference —1–22694) May 15, 1989.

Koseki T et al: "An Investigation of Weld Solidification in Cre–Ni–Fe–Mo Alloys" Welding International, vol. 6, no. 7, Jan. 1, 1992, pp. 516–522.

Stephenson N: "Versatility of Highly Alloyed Ni–Cr–Mo Welding Consumables —Part 1" Welding and Metal Fabrication, vol. 58, no. 7, Aug. 1, 1990, pp. 376, 378, 380.

* cited by examiner

*Primary Examiner*—Roy King
*Assistant Examiner*—Harry D. Wilkins, III
(74) *Attorney, Agent, or Firm*—Oblon, Spivak, McClelland, Maier & Neustadt, P.C.

(57) ABSTRACT

Nickel-based alloy useful for welding, welding method, and welding electrode.

10 Claims, No Drawings

WELDING ELECTRODE MADE OF A NICKEL-BASED ALLOY AND THE CORRESPONDING ALLOY

BACKGROUND OF THE INVENTION

1. Field of the Invention

The invention relates to a nickel-based alloy. Preferably, the alloy is particularly suitable for the manufacture of a welding electrode containing a wire made of a nickel-based alloy which may be used for the welding of products or workpieces, especially sheets and plates, made of metal, and especially of superaustenitic stainless steel or superduplex stainless steel. This alloy may also be used for producing, by welding, corrosion-resistant coatings on products made of low-alloy steel. A welding electrode and a process of welding are also described.

2. Discussion of the Background

Many items of equipment having to withstand corrosion are manufactured by the welding assembly of products such as sheets, plates or tubes made of superaustenitic or superduplex stainless steel. Superaustenitic and superduplex stainless steels are stainless steels containing (in % by weight) especially 18% to 30% chromium, up to 7% molybdenum, up to 0.5% nitrogen as well as nickel, the content of which is adjusted in order to obtain either an entirely austenitic structure or a mixed structure which is partially austenitic and partially ferritic. These steels are characterized by a number PREN=Cr %+3.3Mo %+16N % of greater than 35. This number is an indicator of the resistance to localized corrosion, which resistance is better the higher the number.

In order for equipment manufactured in this way to behave satisfactorily in service, the welds must exhibit both corrosion resistance and mechanical properties such as satisfactory hardness and toughness which are compatible with the properties of welded sheets or plates. In addition, the welds must be able to be produced without them having any defects.

When the conditions of use require that the welds exhibit corrosion resistance as good as the base metal, the products are welded with a filler metal made of a nickel-based alloy of the 625 type containing approximately 22% chromium, 9% molybdenum and 3.5% niobium, the balance being impurities resulting from smelting. In particular, this alloy does not contain nitrogen. This technique has the drawback of causing problems of heat cracking and of composition heterogeneity of the welds.

In order to remedy these drawbacks, it has been proposed to use a niobium-free nickel-based alloy containing from 18% to 25% chromium, from 6% to 12% molybdenum completely or partially replaced with tungsten (6%≦Mo+W≦12%), from 0.1% to 3% copper and from 0.1 to 0.3% nitrogen. This alloy has the advantage of leading to welds which exhibit good hot-cracking resistance, good corrosion resistance and good toughness. However, because of the presence of copper, this alloy is difficult to hot roll and, because of a high nitrogen content, which leads to the formation of nitrides of the $(0.5Cr, 0.32Ni, 0.18Mo)_5N$ type, it is difficult to wiredraw. Moreover, at least in the case of superaustenitic steels, the corrosion resistance of the welds is slightly lower than with 625 alloy containing niobium.

In order to remedy the drawbacks resulting from the presence of copper and from a high nitrogen content, it has been proposed to use a nickel-based alloy of the type containing 22% chromium and 9% molybdenum, containing neither niobium nor copper and with a nitrogen content of less than 0.1%. This alloy hot rolls and wiredraws well, and leads to welds which exhibit good hot-cracking resistance. When welding superduplex alloys, this alloy improves the toughness of the welds by limiting segregation and the formation of intermetallic phases. However, in the case of superaustenitic stainless steels, the resistance to localized corrosion of the welds obtained is not as good as would be desired. In addition, in the case of superduplex steels, the hardness of the welds is slightly insufficient.

SUMMARY OF THE INVENTION

One object of the present invention is to remedy these drawbacks by providing a nickel-based alloy which can be used for the manufacture of wire for the welding of products made of superduplex or superaustenitic stainless steel, is easy to hot roll and to wiredraw and leads to welds having good hot-cracking resistance, good toughness, satisfactory hardness and good corrosion resistance.

Another object relates to a method of welding sheets or plates of superaustenitic stainless steel or superduplex stainless steel and to a welding method for coating products made of low-alloy steel by addition of metal by melting a welding electrode as defined above.

The invention also relates to the nickel-based alloy of which the welding electrode is composed and whose composition is defined herein. Other objects are apparent from the description above and from that which follows.

The invention nickel-based alloy and welding electrode wire or strip of this nickel-based alloy, has a chemical composition which comprises, consists essentially of, or consists of, by weight:

20%≦Cr≦24%
8%≦Mo≦12%
0.1%≦W≦5%
Mo+W>12%
Fe<5%
Cu<0.1%
N<0.1%
C<0.02%
Si<0.1%
Mn<0.4%
0.03%≦Al≦0.4%
0.004%≦Mg≦0.04%
P<0.02%
S<0.02%,
nickel and impurities resulting from smelting.

Preferably, the chemical composition is such that:
21%≦Cr≦23%
9%≦Mo≦11%
2%≦W≦4%
Fe<2%

It should be noted that this alloy can also be used for welding metal in general, including steel products of the 9% nickel type (containing mainly iron and 9% nickel) intended for cryogenic applications. The alloy can also be used especially in the form of sheets, plates, bars, tubes and forgings or form the non-corrodible layer of a clad sheet or plate.

When the welding electrode consists of a wire, this may be bare and the electrode may be used for welding according to the MIG process or to the TIG process. The wire may also form the core of a non-synthetic covered electrode. A nonsynthetic covered electrode, known per se, consists of a metal core covered with materials intended especially to form a slag which has no influence on the content of the main elements of the deposited metal.

Thus, the electrode according to the invention is especially either a bare wire made of an alloy according to the invention or a covered electrode, the core of which is a wire made of an alloy according to the invention, or else a strip made of an alloy according to the invention.

The invention will now be described in greater detail and illustrated by examples.

DESCRIPTION OF THE PREFERRED EMBODIMENTS

The invention alloy may be used as a welding electrode for welding superduplex or superaustenitic stainless steels, and is a nickel-based alloy whose chemical composition comprises, consists essentially of, consists of, by weight:

from 20% to 24%, and preferably 21% to 23%, chromium and from 8% to 12%, and preferably from 9% to 11%, molybdenum in order to ensure resistance to localized corrosion while also avoiding the formation of intermetallic phases, especially during the solidification of weld beads;

from 0.1% to 5%, and preferably from 2% to 4%, tungsten in order to harden the weld bead and improve the corrosion resistance without degrading the toughness; the inventors have newly found that tungsten had a particular advantage since, unlike chromium and molybdenum which preferentially segregate in the interdendritic spaces, tungsten preferentially segregates within the dendrite arms; this effect will be explained later;

from 0.03% to 0.4% aluminum and from 0.004% to 0.04% magnesium in order to ensure good compactness of the welds;

nickel and impurities resulting from smelting.

The impurities are especially:

iron, the content of which should remain less than 5% and preferably less than 2% so as to limit the iron content of the molten metal, especially when the alloy is intended to form a coating on a low-alloy steel component by welding, so as to maintain good corrosion resistance;

silicon, the content of which should remain less than 0.1% and manganese, the content of which must remain less than 0.4% in order to reduce the tendency to form the σ phase;

copper, the content of which should absolutely remain less than 0.1% and be as low as possible so as to facilitate hot rolling during the manufacture of wire stock;

nitrogen, the content of which should absolutely remain less than 0.1% so as to avoid the formation of nitrides unfavorable to wiredrawability;

sulfur and phosphorus, the contents of which should remain less than 0.02% in order to ensure good hot-cracking resistance.

It should be noted that the alloy may contain traces of niobium introduced via the raw materials, that is to say less than 0.1% and preferably less than 0.05%.

The particular effect of molybdenum is illustrated by a nickel-based alloy whose average composition is Cr=22%, Mo=10%, W=3% and N≅0%. If a weld is produced with this alloy using the TIG process, the weld bead obtained consists of a solidified alloy whose average chemical composition is that of the filler metal. However, this alloy has a solidification structure consisting of dendrites separated by interdendritic spaces. The composition of the alloy within the dendrite arms is: Cr=20.5%, Mo=7.8%, W=3.7%; in the interdendritic spaces, the composition is Cr=24%, Mo=14.5%, and W=2.3%.

The effect of chromium, molybdenum and tungsten on the resistance to localized corrosion may be evaluated by a number PREN(W)=Cr %+3.3 (Mo %+½W %)+16N %. The higher this number, the better the resistance to localized corrosion. Using this number, the resistance to localized corrosion of the alloy having the average composition may be compared with that of the dendrite arms. It is also possible to compare the resistance to localized corrosion within the dendrite arms of two alloys having the same average resistance to localized corrosion but one containing tungsten and the other not:

|  |  | Cr | Mo | W | PREN(W) |
|---|---|---|---|---|---|
| Alloy 1 | average composition | 22% | 10% | 3% | 59.95 |
|  | dendrite arms | 20.5% | 7.8% | 3.7% | 52.35 |
| Alloy 2 | average composition | 22% | 11.5% | 0% | 59.95 |
|  | dendrite arms | 20.5% | 8.97% | 0% | 50.10 |

These results show that, although having the same average PREN(W), Alloy 1 containing tungsten has a superior resistance to localized corrosion in the dendrite arms than Alloy 2 not containing tungsten. Moreover, it should be noted that, because of the segregation of chromium and molybdenum, the resistance to localized corrosion is in both cases superior in the interdendritic spaces than in the dendrite arms.

In order to manufacture welding electrodes, the alloy may be conventionally smelted, for example in an electric furnace, and then cast in the form of billets which are hot rolled to form a wire stock. The wire stock is then wiredrawn in order to obtain a wire which can be used as a welding electrode.

Because of its composition, the alloy according to the invention is hot rolled more easily than the alloys of the prior art, especially because its solidus temperature is higher, namely 1367° C. as opposed to 1283° C. for a typical alloy containing approximately 21.8% chromium, 8.6% molybdenum and 3.5% niobium. In addition, because of the low nitrogen content, it wiredraws as easily as the alloys of the prior art which contain little nitrogen, and much more easily than the alloys having a high nitrogen content.

In order to weld products made of superaustenitic or superduplex stainless steel or steel of the Fe-9%Ni type, the MIG process or TIG process, which are known per se, may for example be used, in which processes the electrode is a metal wire. When a product made of low-alloy steel is coated by welding, the welding electrode is a cold-rolled strip.

The beads thus obtained have a tensile strength approximately 60 MPa higher than the weld beads obtained using the electrodes according to the prior art which contain neither niobium nor tungsten. This higher tensile strength depends on the precise molybdenum and tungsten contents, the effect of which on the hardness may be determined by the formula $$HV=136+5.8(Mo\ \%+0.6W\ \%).$$

Because the filler metal is diluted with the base metal, the corrosion resistance of a particular weld depends both on the base metal (the metal of which the welded products are composed) and on the welding conditions (single-pass or multipass welding, for example). However, the corrosion resistance obtained using different filler metals may be compared, by comparing the critical pitting temperatures CPT of the alloys (excluding dilution in the weld), these temperatures being measured according to the ASTM G48A test.

In the as-solidified state, the CPT is 95° C. for the alloy according to the invention, while it is only 50° C. for a nickel-based alloy containing 22% chromium, 8.7% molybdenum and 0.04% nitrogen, the balance being nickel and impurities. For the same alloys in the formed state, the CPT is greater than 95° C. and of the order of 50° C. respectively. Furthermore, the welds do not exhibit hot cracking.

By way of a first example, 8 mm thick plates of superduplex stainless steel were welded using the MIG process, the steel having the composition (in % by weight):

| Cr | Ni | Mo | N | C | Si | Mn | S | P | Fe | PREN |
|---|---|---|---|---|---|---|---|---|---|---|
| 25.0 | 6.3 | 3.7 | 0.25 | 0.015 | 0.34 | 1.0 | 0.001 | 0.012 | bal | 41.2 |

The welding was carried out using an electrode according to the invention, Electrode A, and three electrodes according to the prior art, Electrodes B, C and D. The electrodes consisted of wires 1.2 mm in diameter. The shielding gas was a mixture of 80% argon and 20% nitrogen. The welding energy was 0.8 kJ/mm.

The electrodes were made of nickel-based alloys of chemical compositions (in % by weight):

In order to characterize the welds, the following were measured:

the volume fraction of interdentritic precipitates in the melted zone;

the HV5 hardness in the melted zone;

the strength $R_m$ (in MPa) in the melted zone;

the impact toughness $K_{CV}$ (in J/cm$^2$) at −50° C. and +20° C., the critical pitting temperature CPT (in °C.) relating generally to the heat-affected zone except in the case of Electrode C for which pitting appeared simultaneously in the heat-affected zone and in the melted zone; this temperature is measured according to the ASTM G 48 A standard.

The results were as follows:

| | % interdendritic precipitates | HV5 in the melted zone | $R_m$ in the melted zone | $K_{cv}$ −50° C. | (J/cm$^2$) +20° C. | CPT (° C.) |
|---|---|---|---|---|---|---|
| A | 1 | 195 | 862 | 142 | 166 | 50 |
| B | 5 | 210 | 964 | 37 | 48 | 50 |
| C | 0.4 | 180 | 790 | 158 | 194 | 45 |
| D | 3 | 190 | 838 | 86 | 113 | 50 |

These results show that, with the alloy according to the invention, on the one hand the volume fraction of interdendritic precipitates is low, this being conducive to obtaining good toughness, especially at low temperatures, and the critical pitting temperature is satisfactory; on the other hand, the HV5 hardness and the tensile strength $R_m$, although slightly lower than for Alloy B (corresponding to alloy 625 containing niobium), are considerably better than for Alloy C. For the alloy according to the invention, the impact toughness is very markedly superior to that of Alloy B or Alloy D.

By way of a second example, using the same wires as in the previous example, 12 mm thick plates of superaustentitic stainless steel were welded using the MIG process (bare wire) and with covered electrodes, the chemical composition of the steel being:

| | Cr | Mo | W | Nb | Fe | Cu | N | C | Si | Mn | Al | Mg | P | S | PREN(W) |
|---|---|---|---|---|---|---|---|---|---|---|---|---|---|---|---|
| A | 21.9 | 9.9 | 3.1 | 0.01 | 1.1 | <0.01 | 0.07 | 0.005 | 0.06 | 0.05 | 0.12 | 0.02 | 0.004 | 0.002 | 60.8 |
| B | 21.9 | 8.7 | 0.03 | 3.74 | 0.7 | <0.01 | 0.02 | 0.005 | 0.08 | 0.03 | 0.14 | 0.022 | 0.006 | 0.002 | 51.0 |
| C | 22.0 | 8.8 | 0.03 | 0.01 | 0.7 | <0.01 | 0.05 | 0.004 | 0.05 | 0.05 | 0.07 | 0.024 | 0.004 | 0.002 | 51.9 |
| D | 21.9 | 8.5 | 0.01 | 0.03 | 5.76 | 0.6 | 0.16 | 0.011 | 0.14 | 0.12 | 0.01 | 0 | 0.006 | 0.005 | 52.5 |

| Cr | Ni | Mo | N | Cu | C | Si | Mn | S | P | Fe | PREN |
|---|---|---|---|---|---|---|---|---|---|---|---|
| 20.6 | 24.5 | 6.2 | 0.2 | 0.92 | 0.021 | 0.26 | 0.79 | 0.001 | 0.014 | bal | 44.3 |

The welding energy was 1.1 kJ/mm.

In order to characterize the welds, the following were measured:

the volume fraction of interdendritic precipitates in the melted zone;

the impact toughness $K_{CV}$ (in J/cm$^2$) at +20° C.;

the critical pitting temperature CPT (in °C.) measured according to the ASTM G 48A standard.

The results are as follows:

| | % interdendritic precipatates | $K_{cv}$ at 20° C. (J/cm$^2$) | | CPT (° C.) according to ASTM G 48A | |
|---|---|---|---|---|---|
| | | MIG | covered electrode | MIG | covered electrode |
| A | 0.5 | 275 | 130 | 70 | 65 |
| B | 3 | 150 | 45 | 60 | 57.5 |
| C | 0.2 | 300 | 145 | 50 | 50 |
| D | 1.5 | 220 | 95 | 60 | 55 |

These results show in particular that the alloy according to the invention makes it possible to obtain a corrosion resistance, measured by the temperature CPT, appreciably higher than for the alloys according to the prior art in which pitting in the melted zone (especially for Alloy C) is observed, and also that it is possible to achieve appreciably higher impact toughness than for Alloy B or Alloy D.

Moreover, the use of Electrode A makes it possible to obtain superduplex or superaustenitic stainless steel welds of high quality because of the good hot-cracking resistance of this alloy.

Hot cracking, which may especially occur in the beads already deposited when the latter are affected by the deposition of new beads, in the case of the welding of thick products, is reduced when the melting range (melting point-solidus temperature) is small. The results below show that Alloy A according to the invention has a slightly smaller melting range than Alloy C (containing no Nb) and much smaller than Alloy B (containing Nb). Consequently, the hot-cracking resistance of Alloy A is comparable to that of Alloy C and much better than that of Alloy B.

| Alloy | Solidus temperature (° C.) | Melting point (° C.) | Melting range (° C.) |
|---|---|---|---|
| A | 1367 | 1405 | 38 |
| B | 1283 | 1368 | 85 |
| C | 1365 | 1409 | 44 |

The hot-cracking resistance of the melted zone was also measured using the Varestraint test, know per se, for Alloys A and B. This test, which consists in imposing a given strain on a weld bead and then in measuring the length of the cracks produced by this strain (maximum crack length and cumulative length of the cracks), gave the following results:

| Alloy | Imposed strain (%) | Maximum crack length (mm) | Cumulative length of the cracks (mm) |
|---|---|---|---|
| A | 1 | 0 | 0 |
| | 2.5 | 0.2 | 0.5 |
| B | 1 | 0.4 | 0.8 |
| | 2.5 | 0.9 | 3.6 |

These results show that the hot-cracking susceptibility of Alloy A according to the invention is much lower than that of Alloy B.

French patent application 98 15104 is incorporated herein by reference.

What is claimed is:

1. A welding electrode comprising a wire or strip made of a nickel-based alloy, wherein the chemical composition of said alloy consists essentially of, by weight:

20%≦Cr≦24%
8%≦Mo≦12%
0.1%≦W≦5%
Mo+W>12%
Fe<5%
Cu<0.1%
N<0.1%
C<0.02%
Si<0.1%
Mn<0.4%
0.03%≦Al≦0.4%
0.004%≦Mg≦0.04%
P<0.02%
S<0.02%, nickel and impurities resulting from smelting.

2. The welding electrode as claimed in claim 1, whose chemical composition is such that:

21%≦Cr≦23%
9%≦Mo≦11%
2%≦W≦4%
Fe<2%.

3. The electrode as claimed in claim 1, which consists of a bare wire.

4. The electrode as claimed in claim 1, which is a nonsynthetic covered wire electrode.

5. A method of welding sheets or plates made of superaustenitic stainless steel or superduplex stainless steel or steel containing 9% nickel, by addition of metal by melting a welding electrode, wherein the welding electrode is the electrode of claim 1.

6. A method of welding, comprising welding two metal workpieces together in the presence of the electrode of claim 1.

7. The welding electrode as claimed in claim 1, wherein the chemical composition of said alloy consists of, by weight:

20%≦Cr≦24%
8%≦Mo≦12%
0.1%≦W≦5%
Mo+W>12%
Fe<5%
Cu<0.1%
N<0.1%
C<0.02%
Si<0.1%
Mn<0.4%
0.03%≦Al≦0.4%
0.004%≦Mg≦0.04%
P<0.02%
S<0.02%
nickel and impurities resulting from smelting.

8. A nickel-based alloy, whose chemical composition consists essentially of, by weight:
20%≦Cr≦24%
8%≦Mo≦12%
0.1%≦W≦5%
Mo+W>12%
Fe<5%
Cu<0.1%
N<0.1%
C<0.02%
Si<0.1%
Mn<0.4%
0.03%≦Al≦0.4%
0.004%≦Mg≦0.04%
P<0.02%
S<0.02%,
nickel and impurities resulting from smelting.

9. The nickel-based alloy as claimed in claim 8, wherein the chemical composition of the alloy is such that:
21%≦Cr≦23%
9%≦Mo≦11%
2%≦W≦4%
Fe<2%.

10. The nickel-based alloy as claimed in claim 8, whose chemical composition consists of, by weight:
20%≦Cr≦24%
8%≦Mo≦12%
0.1%≦W≦5%
Mo+W>12%
Fe<5%
Cu<0.1%
N<0.1%
C<0.02%
Si<0.1%
Mn<0.4%
0.03%≦Al≦0.4%
0.004%≦Mg≦0.04%
P<0.02%
S<0.02%
nickel and impurities resulting from smelting.

* * * * *